United States Patent
Fielding, Jr.

(10) Patent No.: US 7,789,080 B2
(45) Date of Patent: Sep. 7, 2010

(54) UNDERWATER TARGET GAME APPARATUS

(75) Inventor: Jerry Fielding, Jr., 11325 Guyn Dr., Brighton, MI (US) 48114

(73) Assignee: Jerry Fielding, Jr., Brighton, MI (US)

( * ) Notice: Subject to any disclaimer, the term of this patent is extended or adjusted under 35 U.S.C. 154(b) by 682 days.

(21) Appl. No.: 11/531,454

(22) Filed: Sep. 13, 2006

(65) Prior Publication Data
US 2007/0074712 A1  Apr. 5, 2007

Related U.S. Application Data

(60) Provisional application No. 60/716,718, filed on Sep. 13, 2005.

(51) Int. Cl.
*F41B 7/08* (2006.01)
*F41B 7/04* (2006.01)
*F41J 1/00* (2006.01)

(52) U.S. Cl. .................. 124/27; 273/350; 273/407

(58) Field of Classification Search ............... 43/6; 124/69, 74, 26, 27; 273/348, 348.3, 350, 273/406, 407

See application file for complete search history.

(56) References Cited

U.S. PATENT DOCUMENTS

| | | | | | |
|---|---|---|---|---|---|
| 2,856,912 | A | * | 10/1958 | Erickson | 124/27 |
| 2,923,286 | A | * | 2/1960 | Draganti | 124/61 |
| 3,004,533 | A | * | 10/1961 | Ritz | 124/27 |
| 4,854,067 | A | * | 8/1989 | Tersiev et al. | 43/6 |
| 5,086,749 | A | * | 2/1992 | Ekstrom | 124/74 |
| 5,368,307 | A | * | 11/1994 | Hotchkiss | 273/350 |
| 5,775,694 | A | * | 7/1998 | Jonsson | 273/348.3 |
| 5,979,424 | A | * | 11/1999 | Alvarez et al. | 124/16 |
| 6,511,074 | B1 | * | 1/2003 | Fireman | 273/350 |
| 6,699,091 | B1 | * | 3/2004 | Warner | 446/153 |
| 2004/0102260 | A1 | * | 5/2004 | Chia | 473/472 |
| 2004/0173197 | A1 | * | 9/2004 | Moffitt | 124/74 |

* cited by examiner

*Primary Examiner*—John Ricci
(74) *Attorney, Agent, or Firm*—Harness, Dickey & Pierce, P.L.C.

(57) ABSTRACT

An underwater target game apparatus includes a submersible propelling structure and a projectile to be launched by the submersible propelling structure. The projectile includes an elongated shaft portion and a head portion. The projectile has a specific gravity of approximately 1.0.

19 Claims, 3 Drawing Sheets

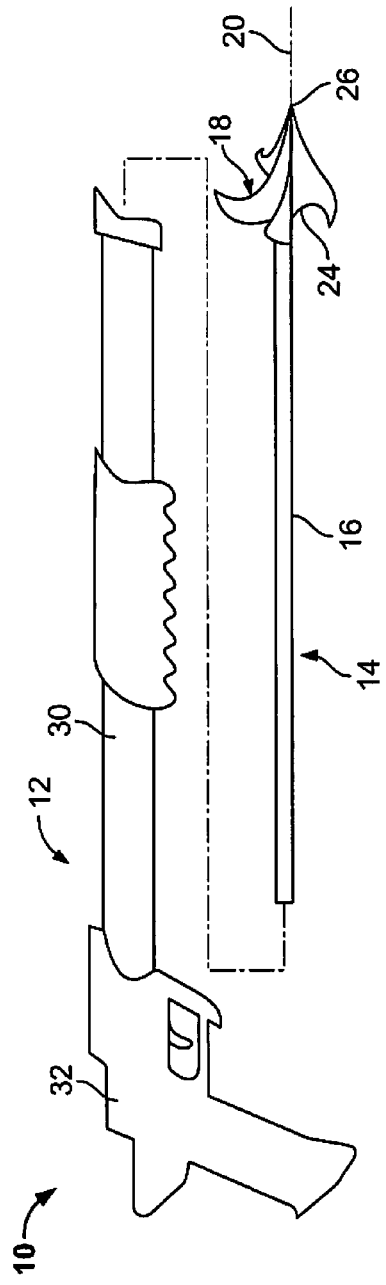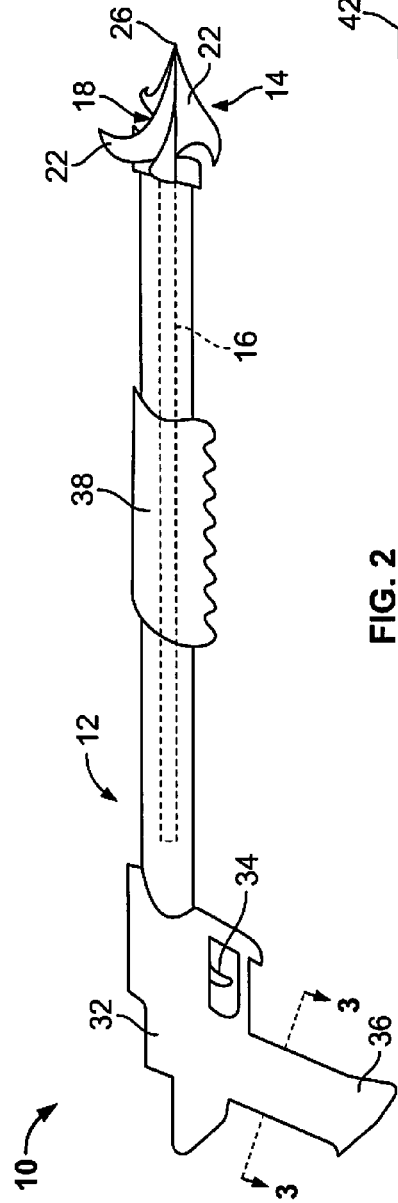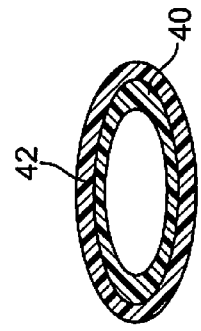

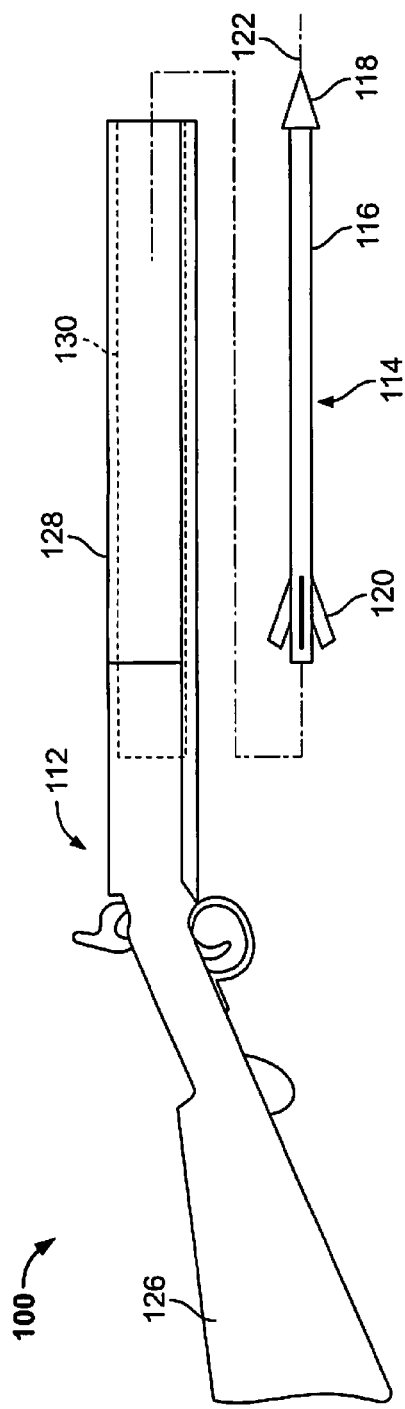
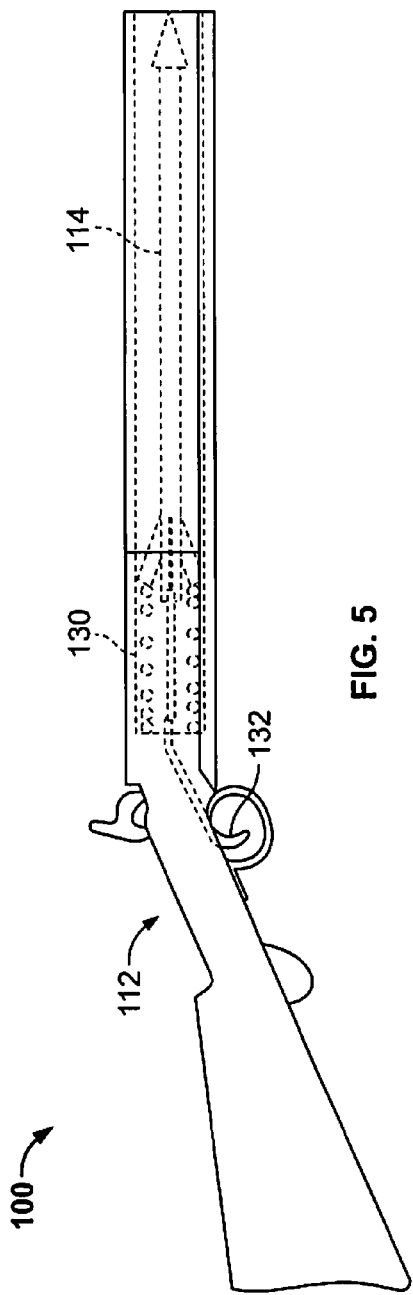
FIG. 4
FIG. 5

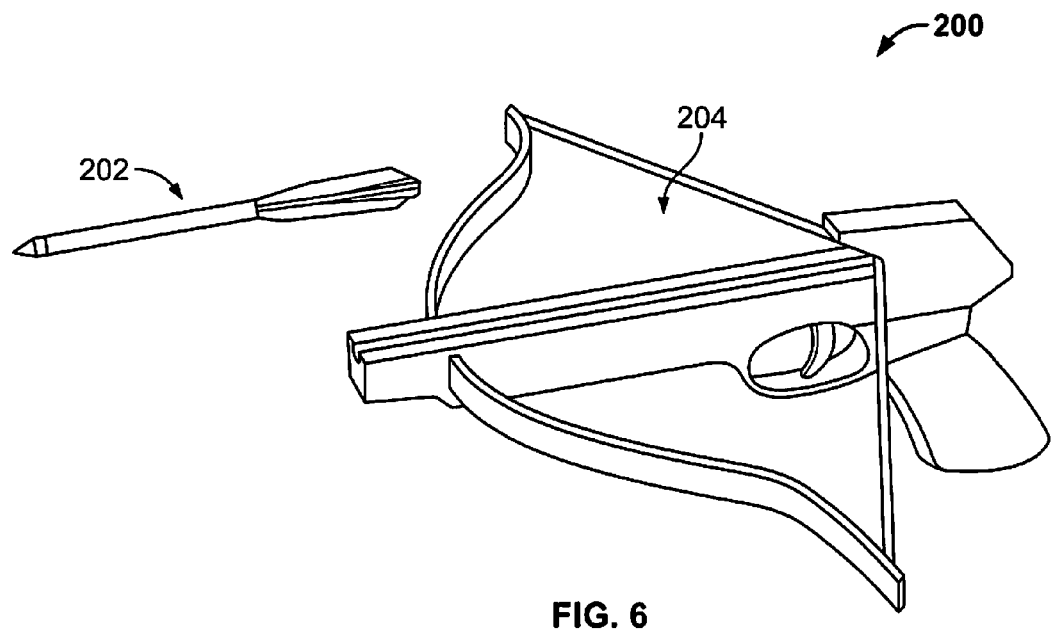
FIG. 6
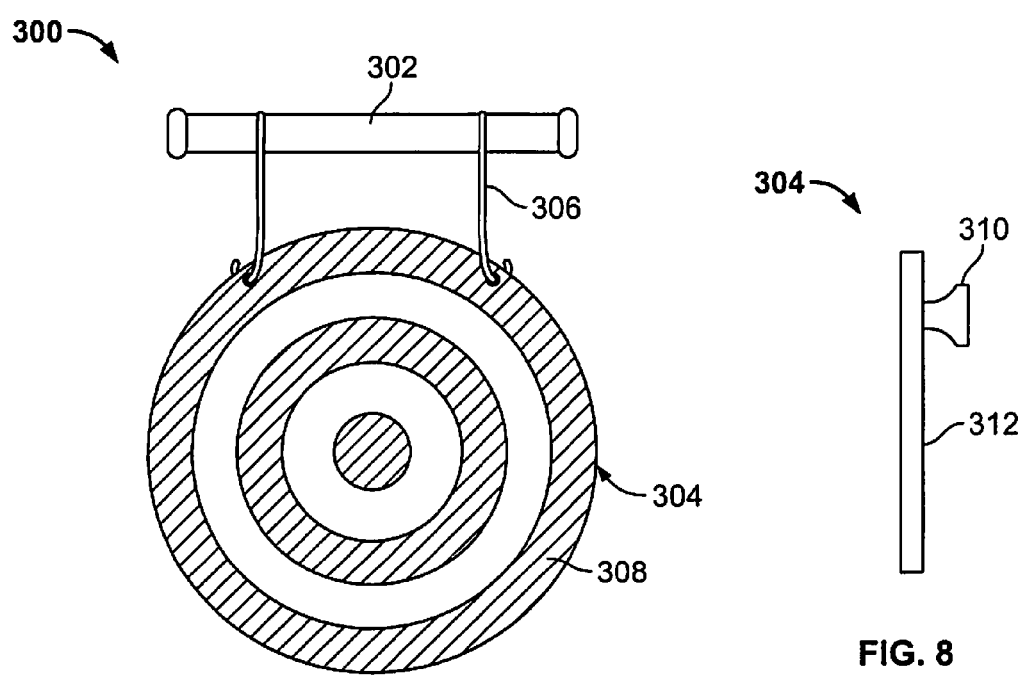
FIG. 7
FIG. 8

UNDERWATER TARGET GAME APPARATUS

CROSS-REFERENCE TO RELATED APPLICATIONS

This application claims priority to U.S. Provisional Patent Application No. 60/716,718 filed 13 Sep. 2005, which application is herein expressly incorporated by reference.

INTRODUCTION

Target based games and target based sporting activities are extremely popular with both youths and adults. Various types of target based games are known. Many such target based games and sporting activities are centered around hunting type weapons such as guns or bow and arrows which require adult supervision. Other such target based games and sporting activities involve video games which provide very limited physical exercise.

Also popular are recreational aquatic activities. Aquatic activities including, but not limited to, pool activities are known to provide children with an increased level of physical exercise. While many aquatic activities are known that involve balls, target based aquatic activities that would appeal to children and provide important physical exercise are very limited.

It remains desirable in the pertinent art to provide an underwater target game apparatus that overcomes the disadvantages and limitations associated with the known prior art, including but not limited to, those discussed above.

SUMMARY

In one particular form, the present teachings provide an underwater target game apparatus. The underwater target game apparatus includes a submersible propelling structure and a projectile to be launched by the submersible propelling structure. The projectile includes an elongated shaft portion and a head portion. The projectile has a specific gravity of approximately 1.0.

In another particular form, the present teachings provide an underwater target game apparatus including a buoyant element and a target proper. The buoyant element has a specific gravity greater than 1.0. The target proper has a specific gravity less than 1.0. The target proper may be suspended underwater from the buoyant element.

Further areas of applicability of the present teachings will become apparent from the detailed description provided hereinafter. It should be understood that the detailed description and specific examples, while indicating the particular embodiments of the present teachings, are intended for purposes of illustration only and are not intended to limit the scope of the invention.

BRIEF DESCRIPTION OF THE DRAWINGS

The present teachings will become more fully understood from the detailed description and the accompanying drawings, wherein:

FIG. 1 is a side view of an underwater target game apparatus in accordance with the present teachings including a propelling structure and a projectile, the projectile shown removed from the propelling structure for purposes of illustration.

FIG. 2 is a side view of the propelling structure and the projectile of FIG. 1, the projectile shown operatively associated with the propelling structure.

FIG. 3 is a cross-sectional view taken along the line 3-3 of FIG. 2.

FIG. 4 is a side view of another underwater target game apparatus in accordance with the present teachings including a propelling structure and a projectile, the projectile shown removed from the propelling structure for purposes of illustration.

FIG. 5 is a side view of the propelling structure and the projectile of FIG. 4, the projectile shown operatively associated with the propelling structure.

FIG. 6 is a side view of another underwater target game apparatus in accordance with the present teachings including a propelling structure and a projectile, the projectile shown removed from the propelling structure for purposes of illustration.

FIG. 7 is a front view of a target assembly for the underwater target game apparatus of the present invention.

FIG. 8 is a side view of a portion of the target assembly of FIG. 7.

DESCRIPTION OF VARIOUS ASPECTS

The following description of the embodiment(s) is merely exemplary in nature and is in no way intended to limit the invention, its application, or uses.

The present teachings are generally directed to an underwater target game apparatus. As will be addressed below, the underwater target game apparatus includes a projectile particularly adapted to be launched or projected from a propelling structure. The projectile is constructed and configured such that it substantially maintains an intended course of direction or path after being propelled within a body of water.

With initial reference to the FIGS. 1 through 3, an underwater target game apparatus constructed in accordance with the present teachings is illustrated and generally identified at reference 10. The underwater target game apparatus 10 is shown to generally include a propelling arrangement or propelling structure 12 and a projectile 14 that is propelled by the propelling structure 12. In FIG. 1, the projectile 14 is shown removed from the propelling structure 12. In FIG. 2, the projectile 14 is shown operatively associated with the propelling structure 12.

With particular reference to FIGS. 1 and 2, the projectile 14 will be further described. The projectile 14 is illustrated to generally include a shaft 16 and a head 18. The shaft 16 is generally elongated along a shaft axis 20. The shaft 16 may include a smooth outer surface. The shaft 16 may be a solid structure. Alternatively, the shaft 16 may be hollow and thereby include an internal bore (not shown).

The head 14 may be integrally formed with the shaft 16. Alternatively, the head 14 may be secured to the shaft 16 in any manner well known in the art.

The length of the shaft 16 generally renders the projective 14 generally impractical to be launched by hand. The head 14 may include means for substantially maintaining an intended underwater flight path. The means for maintaining the intended underwater flight path may include a plurality of blade-type structures or fins 22. It will be understood that the blade-type structures 22 need not be sharp and function to stabilize the projectile 14 for underwater flight. As illustrated, the plurality of blade-type structures may include four blade-type structures 22. Alternatively, the head 16 may include a greater or lesser number of blade-type structures 22.

The blade-type structures or fins 22 may be equally spaced circumferentially about the axis 20. The blade-type structures 22 may be generally triangular in shape and have a base 24 extending in a direction generally perpendicular to the axis 20 and forwardly terminating at a common tip 26 of the head 18.

In certain applications, it may be desirable that the blade-type structures 22 are curved. For example, the blade-type structures 22 may be similarly shaped to include a curve to further facilitate a stabilized flight path through the water. In this regard, the blade-type structures 22 may be curved to impart rotation of the projectile 14 about the axis 20.

The projectile 14 may be constructed from a material having a specific gravity at or near approximately 1.0. Such a material has neutral buoyancy and thereby has no natural tendency to either float or sink. The projectile 14 may be alternatively constructed of a material having a specific gravity greater than 1.0 and be provided with cavities trapping air or other naturally buoyant material such that the overall specific gravity of the projectile is approximately 1.0. The projectile 14 may be constructed of polyurethane or any other suitable material. The specific gravity of approximately 1.0 shall mean that the specific gravity of the projectile is such that the projectile may substantially maintain an intended path.

With reference to FIGS. 1-3, the propelling structure 12 will be further described. It is important that the propelling structure be submersible. In this regard, appropriate materials and mechanisms must be selected. These materials and mechanisms should be able to accommodate submersion, particularly submersion in chlorine treated water and/or salt water. The propelling structure 12 may include a plastic frame. The plastic frame may be covered with foam.

The propelling structure 12 is generally illustrated to include an elongated barrel 30 and a stock or handle 32. As will be discussed further below, the propelling structure 12 includes means for imparting propulsion to the projectile 14. The means for imparting propulsion may include a spring mechanism or any other mechanism well known in the art.

The handle 32 carries a trigger 34 which may activate the means for imparting propulsion. The handle 32 includes a grasping section 36 which may be held by one hand of the user. A second grasping area 38 is provided along the barrel 30. As shown in the cross-sectional view of FIG. 3, the handle 32 may be constructed of a hard plastic material 40 and covered with a softer foam material 42.

Turning to FIGS. 4 and 5, another underwater target game apparatus constructed in accordance with the present teachings is illustrated and generally identified at reference character 100. The underwater target game apparatus 100 is again generally shown to include a propelling arrangement or propelling structure 112 and a projectile 114. The projectile 114 may include a shaft 116 and a head 118. The shaft or shaft position 114 may be hollow and include a smooth exterior surface or may alternatively include an internal bore opening (not shown). The shaft 114 may include means for substantially maintaining an intended underwater flight path. The means for substantially maintaining the underwater intended flight path may include a plurality of stabilizing fins 120 extending from a rear end of the shaft 116. In one application, the plurality of stabilizing fins includes four stabilizing fins 120 equally spaced about and axis 122 defined by the projectile 114. Alternatively, the projectile 114 may include a great or lesser number of stabilizing fins.

As with the prior embodiment, the head 118 may be integrally formed with the shaft 114 or secured to the shaft 114 in any manner well known in the art.

The overall specific gravity of the projectile 114 is again at or approximately 1.0. In this regard, the material for the projectile 114 may have a specific gravity of approximately 1.0 or the material may have a specific gravity slightly greater than 1.0 and the projectile 114 may be configured to include cavities filled with air or other material to make the projectile 114 neutrally buoyant.

The propelling structure 112 may again be submersible in water and includes a handle portion 126 and a barrel 128. The barrel 128 defines a chamber 130 that may be cylindrical and is adapted to receive the projectile 114. The propelling structure 112 includes means for imparting propulsion to the projectile. The means for imparting propulsion may include a spring 130 which is compressed upon forcibly introducing the projectile 114 into the chamber 130. The spring may be coupled in a manner known in the art to a trigger 132. In this regard, the trigger 132 is coupled to the spring through a mechanism for retaining the spring 130 in its coil position (as shown in FIG. 5). When the trigger 132 is pulled, the mechanism releases the coiled spring 130 and allows the spring 132 impart the propulsion to the projectile 114. The spring may be constructed of stainless steal or otherwise treated to prevent corrosion.

The propelling structure 112 may also include alternative means for imparting propulsion. Such alternative means may include an air pump for pneumatically propelling the projectile 14 or a gas source such as $CO_2$ or nitrogen. Turning to FIG. 6, another underwater target game apparatus constructed in accordance with the present teachings is illustrated and identified at reference character 200. Again, the underwater target game apparatus 100 includes a projectile 202 and a propelling structure 204. The propelling structure 204 is generally in the form of a cross-bow. Again, the overall specific gravity of the projectile 202 is approximately 1.0.

Turning to FIGS. 7 and 8, a target arrangement for use with the underwater target game apparatus of the present invention is illustrated and generally identified at reference character 300. The target arrangement 300 includes a buoyant element 302 having a specific gravity less than 1.0 and a target proper 304. The specific gravity of the buoyant member 302 makes the buoyant member neutrally buoyant. The target proper 304 may be connected to the buoyant member 304 through one or more strings 306, chains or other suitable structure.

The target proper 304 may include a specific gravity greater than 1.0 so as to be negatively buoyant and hang downward in the water from the buoyant member 304. A front face 308 of the target proper 304 may include indicia representative of a target.

As shown in FIG. 8, the target proper 304 may also include mounting structure 310 extending from a back face 312. The mounting structure may include a suction cup 310 for attaching the target proper 308 to a smooth side of a pool or other structure. In this manner, the target proper 304 may be used without the buoyant member 302. Alternatively, the target proper 308 may be suspended from a string, chain or other suitable structure (not shown) for suspension from a side of the pool or other fixed structure.

In certain applications, it may be desirable to provide an underwater projectile with a magnetic tip and a cooperating target for magnetically capturing the projectile. In other applications, it may be desirable to provide a tether for retrieving the projectile. The tether may simply be a string or a line. The string or line may be used to return the projectile to the user by hand or with a reel-type mechanism.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An underwater target game apparatus comprising:
   a submersible propelling structure; and
   a projectile to be launched by the submersible propelling structure, the projectile including an elongated shaft portion having a leading end and a trailing end and an enlarged head portion for stabilizing the projectile carried at the leading end of the shaft portion, the elongated shaft portion having a generally circular and generally constant cross section, the projectile having a specific gravity of approximately 1.0.

2. The underwater target game apparatus of claim 1, wherein the projectile includes means for substantially maintaining an intended underwater flight path.

3. The underwater target game apparatus of claim 2, wherein the head includes the means for substantially maintaining an intended underwater flight path.

4. The underwater target game apparatus of claim 3, wherein the means for substantially maintaining an intended underwater flight path includes a plurality of blade-type structures.

5. The underwater target game apparatus of claim 4, wherein the blade-type structures are each curved so as to impart rotation of the projectile about an axis defined by the elongated shaft portion.

6. The underwater target game apparatus of claim 3, wherein the means for substantially maintaining an intended underwater flight path is configured to impart rotation of the projectile about an axis defined by the elongated shaft portion.

7. The underwater target game apparatus of claim 2, wherein the elongated shaft portion includes the means for substantially maintaining an intended underwater flight path.

8. The underwater target game apparatus of claim 7, wherein the means for substantially maintaining an intended underwater flight path includes a plurality of fins equally spaced circumferentially about a longitudinal axis of the elongated shaft portion.

9. The underwater target game apparatus of claim 1, wherein the submersible propelling structure includes means for imparting propulsion to the projectile.

10. The underwater target game apparatus of claim 9, wherein the means for imparting propulsion to the projectile includes a spring.

11. The underwater target game apparatus of claim 9, wherein the means for imparting propulsion to the projectile includes an air pump for creating a source of air pressure to pneumatically propel the projectile.

12. The underwater target game apparatus of claim 9, wherein the means for imparting propulsion to the projectile includes a source of gas.

13. The underwater target game apparatus of claim 1, further comprising a submersible target arrangement.

14. The underwater target game apparatus of claim 13, wherein the submersible target arrangement includes a buoyant element having a specific gravity greater than 1.0 and a target proper having a specific gravity less than 1.0, the target proper flexibly interconnected with the buoyant element and suspended underwater from the buoyant element, the target proper including indicia representative of a target.

15. The underwater target game apparatus of claim 13, wherein target proper includes means for securing the target proper to a smooth surface of a pool.

16. The underwater target game apparatus of claim 15, wherein the means for securing the target proper to a smooth surface of a pool includes at least one suction cup.

17. An underwater game comprising:
   a buoyant element having a specific gravity greater than 1.0;
   a target proper having a specific gravity less than 1.0, the target proper flexibly interconnected with the buoyant element and suspended downwardly from the buoyant element, the buoyant element being elongated in a horizontal direction, the target proper including indicia representative of a target;
   a submersible propelling structure; and
   a projectile to be launched by the submersible propelling structure, the projectile including an elongated shaft portion having a leading end and a trailing end and an enlarged head portion for stabilizing the projectile carried at the leading end of the shaft portion, the projectile having a specific gravity of approximately 1.0.

18. The underwater target game apparatus of claim 17, wherein the submersible propelling structure defines an elongated channel for receiving the shaft portion, a diameter of the head being great than a diameter of the elongated channel.

19. An underwater target game apparatus comprising:
   a submersible propelling structure; and
   a projectile to be launched by the submersible propelling structure, the projectile including a leading end defining a head and a trailing end for cooperating with the submersible propelling structure, the projectile having a specific gravity of approximately 1.0;
   wherein the submersible propelling structure and the projectile cooperate in a telescopic manner.

* * * * *